F. W. BANGERT.
HACKSAW FRAME.
APPLICATION FILED OCT. 7, 1915.
1,175,582.
Patented Mar. 14, 1916.
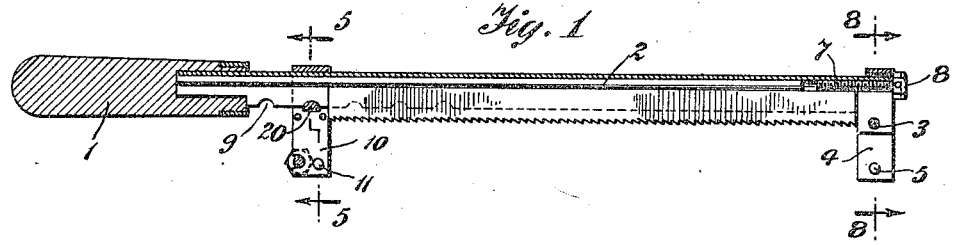
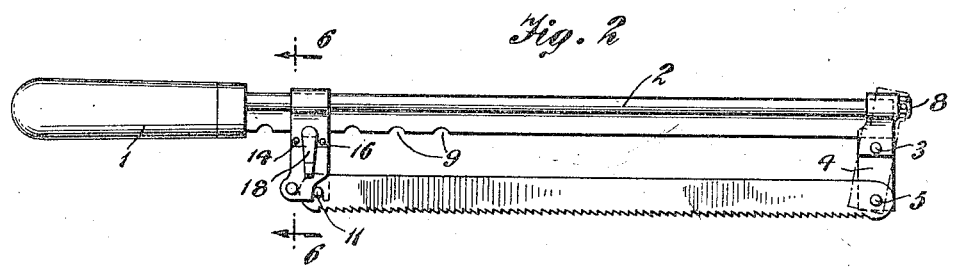
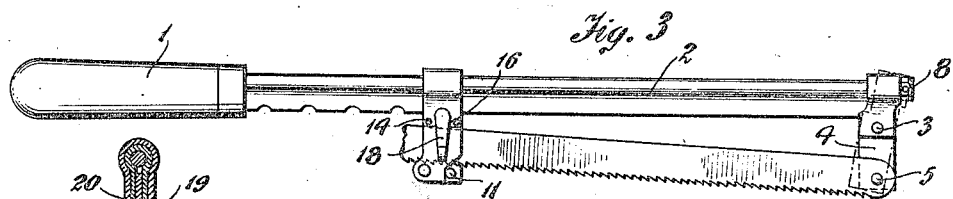
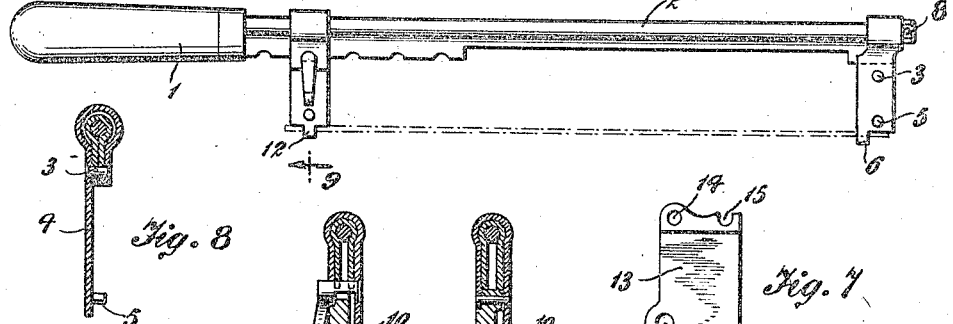
WITNESSES:
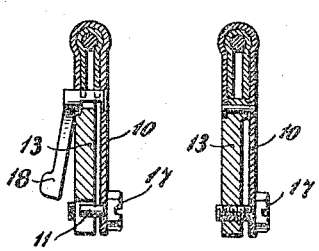
INVENTOR
FREDERIK WILLIAM BANGERT
BY Oscar Geier
ATTORNEY

UNITED STATES PATENT OFFICE.

FREDERIK WILLIAM BANGERT, OF HALEDON, NEW JERSEY.

HACKSAW-FRAME.

1,175,582.

Specification of Letters Patent.

Patented Mar. 14, 1916.

Application filed October 7, 1915. Serial No. 54,512.

*To all whom it may concern:*

Be it known that I, FREDERIK WILLIAM BANGERT, a subject of the Emperor of Germany, and resident of Haledon, in the county of Passaic and State of New Jersey, have invented certain new and useful Improvements in Hacksaw-Frames, of which the following is a specification.

Hack saws of the usual construction are not capable of holding a saw after the end upon which the aperture for engaging the blade pin was arranged has been broken away.

The present invention provides an organization of parts in which a saw blade of any length may be properly held, ready for use, and in which a blade tightening device of new construction is provided permitting the saw blade to be held under proper tension, while in use.

The invention is illustrated in Figure 1 in a vertical section showing the saw blade inserted in the blade guide. Fig. 2 is a side elevation of a hack saw, showing the saw blade in normal condition. Fig. 3 is a similar view showing a saw blade, one end of which has been broken off engaged in the frame. Fig. 4 is a similar view in which the saw blade is shown attached to auxiliary blade pins so as to have the plane of the saw blade at right angles to the plane of the blade holder. Figs. 5 and 6 are vertical cross sections of the movable blade end holder, on the line 5—5 of Fig. 1, and on the line 6—6 of Fig. 2. Fig. 7 is an elevation of the keeper plate. Fig. 8 is a section on the line 8—8 of Fig. 1 of the stationary blade end holder. Fig. 9 is a section on line 9—9 of Fig. 4 of the movable blade end holder, showing the auxiliary pin.

A handle 1 carries the frame or holder, made of sheet metal having a tubular element 2 and a continuous groove along the entire length of holder. The end of the holder is provided with a pivot 3 upon which is movably secured the blade end holder 4, having a blade pin 5 for engaging an aperture at one end of the saw blade. An auxiliary blade pin 6 is, secured at the end of the blade end holder for permitting the saw blade to be held in a position at right angles to the plane of the frame.

A screw 7 engages the end of the frame 2 and is provided with a head 8, adapted to rest against the outer side of the upper end of the blade end holder 4, whereby pressure on the screw toward the handle of the hack saw, causes a movement of the lower end of the blade end holder with its pin 5, away from the handle of the hack saw for the purpose of tightening the saw blade.

The frame is provided with notches 9, adapted to hold the movable blade end holder 10. The latter is provided with a blade pin 11 at its lower end and an auxiliary blade pin 12, corresponding to similar devices arranged on the stationary blade end holder. The movable blade end holder 10 is provided with a keeper plate 13, for the purpose of holding one end of the saw blade, should the end having the aperture for engaging the blade pin be broken off. This keeper plate is pivoted at 14 to the blade end holder, and provided with a recess 15 adapted to engage a stop pin 16 on the movable blade end holder. A tightening screw 17 serves to secure together the keeper plate and the movable blade end holder, so that the end of a saw blade located between, is held against displacement.

A locking lever 18 is arranged with its stem 19, on one side of the movable blade end holder and has a semi-circular section 20, adapted to engage the notches 9 of the frame when the lever 18 is in one position and be disengaging therefrom, when the lever is in another position, so that the blade end holder 10 can readily be moved along the frame.

In the normal operation of the saw frame, the aperture at one end of a saw blade is placed upon the pin 5 of the blade end holder 4, then the movable blade end holder 10 is shifted until the aperture at the other end of the saw blade can be placed upon the blade pin 11. The keeper plate 13 is turned on its pivot so as to cover the end of the saw blade, the screw 17 is tightened and the locking lever 18 turned so that the semi-circular stem 20 engages one of the notches 9 of the frame bar. The screw 7 at the free end of the frame bar is then turned and the blade end holder 4, swinging on its pivot 3, places the saw blade under sufficient tension. In case a saw blade is used, one end of which is broken off, the operation of placing the saw blade into the frame bar is substantially the same, except that the broken-off end of the saw blade is placed upon the movable blade holder whereupon the keeper plate 13 is turned on its pivot, so that the tightening screw 17 forces the blade end holder and the keeper plate together, to securely hold the broken off blade end. In case that it is intended to secure the saw blade to the frame bar so as to be held in a plane at right angles to the plane of the frame bar, one aperture of the saw blade is caused to engage the auxiliary blade pin 6, while the other aperture is engaging the auxiliary blade pin 12 of the movable blade end holder. The saw is then placed under tension in the manner already described by operating the screw head 8.

Claims:—

1. A saw frame including a grooved frame bar having a tubular backing, means pivoted to one end of said frame bar for holding one end of a saw blade, a screw operative in the tubular backing of said frame bar, coacting with said holding means for tensioning said saw blade, and slidable means on said frame bar for holding the other end of said saw blade.

2. The combination with a tubular frame bar having flanges depending therefrom, a saw attaching means at one end of said frame bar pivoted to said flanges, an adjusting screw operative in said tubular frame for actuating said attaching means, a handle at the opposite end of said frame bar, an element slidable on said tubular frame bar, having a depending portion engageable with notches formed in the flanges of said frame bar, means for engaging a saw with said sliding elements, and means for positioning said elements with respect to any of the notches in said flanged frame.

Signed at New York, in the county of New York and State of New York this 4th day of September, A. D. 1915.

FREDERIK WILLIAM BANGERT.

Witnesses:
 F. J. NEKARDA,
 LULU A. KOHLMANN.